E. R. VIBERG.
BRAKE BEAM.
APPLICATION FILED FEB. 2, 1920.
1,388,391.
Patented Aug. 23, 1921.
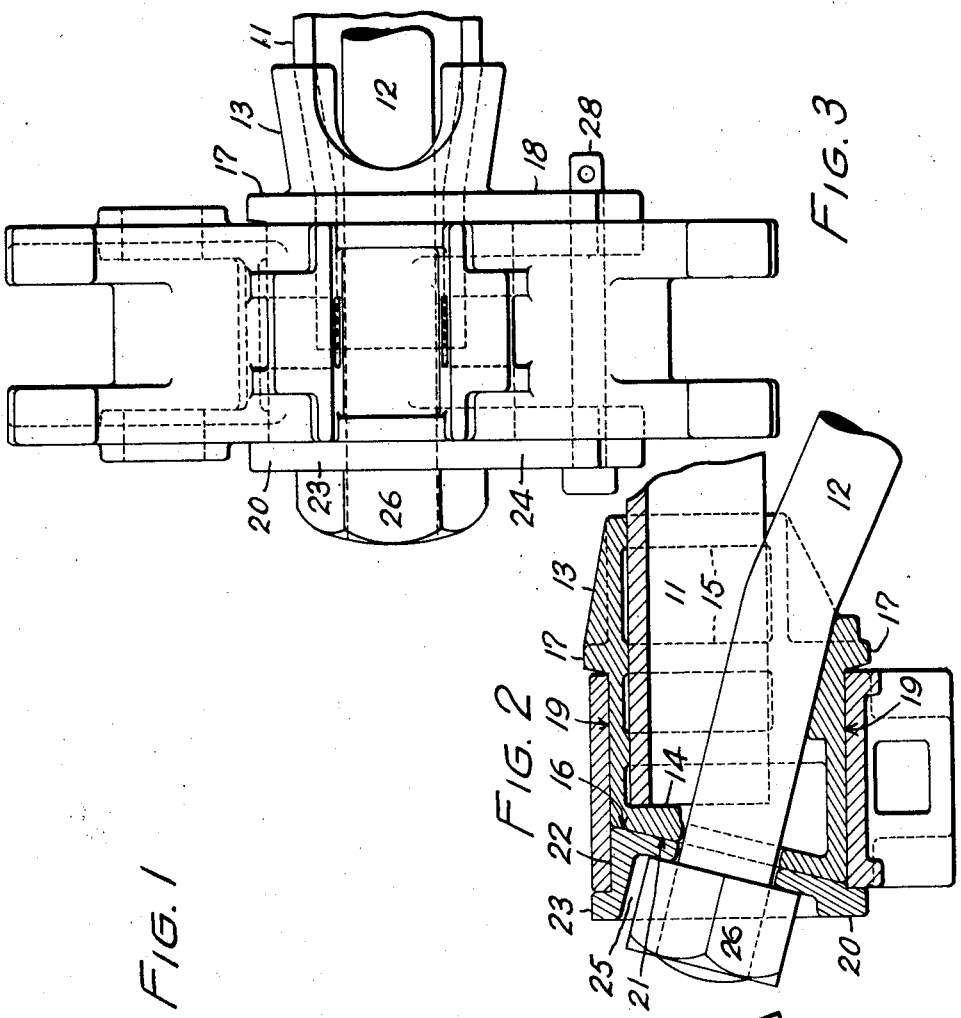
Inventor
Ernest R. Viberg
By
Attys

UNITED STATES PATENT OFFICE.

ERNEST R. VIBERG, OF MONTREAL, QUEBEC, CANADA.

BRAKE-BEAM.

1,388,391.   Specification of Letters Patent.   Patented Aug. 23, 1921.

Application filed February 2, 1920. Serial No. 355,742.

*To all whom it may concern:*

Be it known that I, ERNEST R. VIBERG, a subject of the King of Great Britain, and resident of the city of Montreal, in the Province of Quebec and Dominion of Canada, have invented certain new and useful Improvements in Brake-Beams, of which the following is a full, clear, and exact description.

This invention relates to improvements in brake beams, and the object of the invention is to provide a beam of the simplex type in which the parts may be made heavier and stronger without exceeding the permissible maximum length and without altering the size or design of the brake heads or method of attaching same.

In modern brake beam construction the compression member of the beam is usually a channel and the tension member a round bar which passes at its ends between the arms of the channel and is connected at its ends to the compression member by means of nuts bearing against castings mounted on the ends of the compression member. These castings form supports for the brake heads and must, therefore, be of uniform size and design in order to insure interchangeability of brake heads. The brake head is held to the end casting usually by means of a cap plate which is generally secured by the tension member nut. The increased weight of modern rolling stock necessitates such an increase in the size of brake beam tension members that the larger nuts cannot be kept inside the permissible maximum beam length, with the result that it has sometimes become necessary to trim the ends thus greatly weakening the beam.

According to this invention the end casting is shortened and a hollow end cap used which forms, in part, the supporting bearing of the brake head and serves also to keep the head in place. The hollow of the cap provides a seat for the tension member nut so that a nut of full thickness may be used without exceeding the permissible maximum beam length and without altering the size or position of the brake head bearing. The fact that the compression and tension members of the beam meet at an acute angle is taken advantage of and the outer face of the end casting is formed perpendicular to the tension member axis. The cap is formed to fit the end casting and its axis of rotation is, therefore, coincident with the axis of the tension member and not with the axis of the brake head, so that the cap is held against rotation without any means other than the tension member nut and may, therefore, be used for adjusting the brake head relatively to the brake beam.

In the drawings which illustrate the invention:—

Figure 1 is an end elevation of a brake beam formed according to this invention.

Fig. 2 is a sectional view on the line 2—2, Fig. 1.

Fig. 3 is a bottom plan view.

Referring more particularly to the drawings, 11 designates the compression member and 12 the tension member of a brake beam, the compression member being a channel and the tension member being a round bar which passes between the flanges of the channel at the ends thereof at an acute angle to the web of the channel. The end of the compression member is seated in a cast or forged member 13, through which the end of the tension member passes, the extremity of the compression member abutting a seat 14 near the outer end of the end member and the edges and sides of the flanges bearing on seats 15 located preferably at the inner end of the member. In this way the end member is held rigidly with respect to the compression member and is prevented from rocking or upsetting when the load of the tension member is imposed on it. In order to keep the end member within the permissible size it is necessary to constrict the end of the compression member as to its width, as clearly shown in Fig. 3. The outer end surface 16 of the end member is formed perpendicular to the axis of the tension member, as clearly shown in Fig. 2. Approximately midway between the inner and outer ends of the member a flange 17 is provided which is increased in width on one side to form a lug 18. Between the end surface 16 and the flange 17 a cylindrically curved bearing surface 19 is provided for a brake head.

A cap member 20 is provided having a surface 21 adapted to bear against the surface 16 and having a cylindrically curved bearing surface 22 for a brake head adapted to form a continuation of the bearing surface 19. The outer end of this cap is provided with a flange 23 duplicating the flange 17 and including a portion 24 of increased width. The outer surface of the cap is recessed as at 25, the bottom of the recess being parallel with the surfaces 16 and 21 and, therefore, perpendicular to the axis of the tension member which passes through it. The tension member nut 26 is seated in this recess and, therefore, lies partly inside the plane of the outer end of the end member. The lugs 18 and 24 may be provided with alined apertures 27 through which a bolt 28 may be passed for the purpose of securing a brake head at any desirable angle with respect to the brake beam.

The method of assembling a brake beam is extremely simple. The compression and tension members are brought together and the end members 13 slipped over the ends of the tension member and then pressed onto the ends of the compression member. The brake heads are placed in position, the end caps applied and the tension member nuts screwed on. Renewal of the brake heads is so rarely necessary that there is no disadvantage in having them retained by the tension member nuts. The brake heads are adjusted to proper position on the brake beam and secured by passing the bolts 28 through appropriate apertures 27 in the well known manner.

From the foregoing description and from the drawings it will be seen that the tension member nut is located partly within the end members (the cap being considered a part of the end member) and, therefore, the increased nut thickness, due to the increased tension member diameter, is accommodated without causing the nut to project farther beyond the end member than is permissible. The construction may also be described as an end member formed in two parts and clamping between them a brake head. The plane of separation of the parts is disposed angularly with respect to the axis of the member for a double purpose. Firstly, this angular disposition enables the two parts to be securely locked against any tendency to independent revolution by reason of rocking of the brake head in use. Secondly, it relieves the outer end or cap member of practically all the brake load as it enables the brake head bearing on the load transmitting side to be formed almost entirely on the member 13 so that the cap member 20 does not function to any extent to transmit load from the tension member to the brake head. Thirdly, this construction requires as little or less material than any other.

Having thus described my invention, what I claim is:—

1. In a brake beam, the combination with a brake head of a two-part beam end member fitting within and supporting the brake head, the arrangement being such that the two parts of the end members are in end abutting relation within the head.

2. A device according to claim 1, in which each of the end member parts is provided with a flange, the brake head being clasped between and secured to said flanges.

3. In a brake beam, the combination with compression and tension members of an end member formed in two parts, one of said parts being recessed to receive the compression member and form an abutment therefor and the other part being recessed to receive the tension member nut and form an abutment therefor.

4. In a brake beam, the combination with compression and tension members arranged out of parallel and substantially meeting at their ends, of an end member forming a bearing surface for the brake head comprising two parts, one having a compression member seat arranged perpendicular to the compression member axis and the other having a tension member seat arranged perpendicular to the tension member axis, the arrangement being such that the bottom wall of the tension member seat and the abutting ends of the two parts of the end member are disposed within the brake head.

5. In a brake beam, the combination with compression and tension members arranged out of parallel and substantially meeting at their ends, of an end member comprising two parts meeting in a plane substantially perpendicular to the tension member axis, one of said parts having a compression member seat arranged perpendicular to the compression member axis and the other having a tension member seat arranged perpendicularly to the tension member axis.

6. In a brake beam, the combination with compression and tension members, and a brake head, of an end member formed in two parts insertible in the brake head from opposite sides thereof to conjointly provide a substantially uninterrupted bearing surface therefor, said parts being held together to retain the brake head by said compression and tension members.

7. In a brake beam, the combination with a brake head of a beam end member, comprising two parts insertible in the brake head from opposite sides thereof, said end member parts meeting in a plane out of perpendicular to the axis of rotation of the head and end member, and means holding the end member parts against relative longitudinal movement whereby the same are held against independent revolution.

8. A device according to claim 7, in which the means holding the end member parts against revolution comprises a compression member and a brake beam tension member, between which the end member parts are mounted in compression.

9. A device according to claim 7, in which the end member parts are recessed at remote ends to receive the ends of the compression and tension members.

10. A device according to claim 7, in which the end member parts are recessed at remote ends to receive the compression and tension members, the bottoms of said recesses being out of parallel and being perpendicular to the axes of the members which they receive.

In witness whereof, I have hereunto set my hand.

ERNEST R. VIBERG.